US007571868B2

(12) United States Patent
Bayer

(10) Patent No.: US 7,571,868 B2
(45) Date of Patent: Aug. 11, 2009

(54) INJECTION VALVE FOR FUEL INJECTION

(75) Inventor: Johann Bayer, Strullendorf (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 11/631,749

(22) PCT Filed: Apr. 29, 2005

(86) PCT No.: PCT/EP2005/051954

§ 371 (c)(1),
(2), (4) Date: Nov. 14, 2007

(87) PCT Pub. No.: WO2006/005639

PCT Pub. Date: Jan. 19, 2006

(65) Prior Publication Data

US 2008/0061171 A1 Mar. 13, 2008

(30) Foreign Application Priority Data

Jul. 9, 2004 (DE) ....................... 10 2004 033 280

(51) Int. Cl.

| | |
|---|---|
| ***F02M 51/00*** | (2006.01) |
| *B05B 1/00* | (2006.01) |
| *F02F 11/00* | (2006.01) |
| *F16K 31/02* | (2006.01) |

(52) U.S. Cl. ................. 239/585.3; 239/596; 239/585.1; 239/585.5; 239/585.4; 239/552; 239/DIG. 4; 239/DIG. 19; 277/596; 251/129.21

(58) Field of Classification Search .............. 239/585.3, 239/585.5, 585.1, 584, 569, 596, 552, 585.4, 239/600, DIG. 19, DIG. 4; 251/129.21; 277/591, 277/594, 596

See application file for complete search history.

(56) References Cited

U.S. PATENT DOCUMENTS 4,944,486 A * 7/1990 Babitzka ................ 251/129.21

(Continued)

FOREIGN PATENT DOCUMENTS

DE 195 03 224 8/1996

(Continued)

*Primary Examiner*—Steven Michael Cernoch
(74) *Attorney, Agent, or Firm*—Kenyon & Kenyon LLP

(57) ABSTRACT

A fuel injection valve has a connection piece for a fuel-supply line, a valve-seat support having a valve-seat body provided with a valve opening, a solenoid for activating a valve member, which controls the valve opening, and a plastic extrusion coat enclosing the connection piece, the solenoid and the valve-seat support. To achieve a cost-effective manufacture by requiring fewer components for the injection valve and providing a reduction in the assembly costs, the connection piece and the valve-seat support are made of plastic and designed as one-piece plastic housing together with the plastic extrusion coat. The yoke element for closing the magnetic circuit of the solenoid, which extends across the magnetic core and magnetic armature, is a magnetic material extrusion coat, which encloses the solenoid coil and adjoins the magnetic core in a gapless manner and ends in front of the magnetic armature with a gap clearance.

21 Claims, 3 Drawing Sheets

U.S. PATENT DOCUMENTS

| | | | | |
|---|---|---|---|---|
| 5,263,647 | A * | 11/1993 | Cerny et al. | 239/585.1 |
| 5,312,050 | A * | 5/1994 | Schumann et al. | 239/585.1 |
| 5,716,001 | A * | 2/1998 | Wakeman et al. | 239/74 |
| 5,873,526 | A * | 2/1999 | Cooke | 239/88 |
| 5,875,975 | A * | 3/1999 | Reiter et al. | 239/585.1 |
| 5,918,818 | A * | 7/1999 | Takeda | 239/585.1 |
| 5,921,473 | A * | 7/1999 | Romann | 239/533.2 |
| 6,024,302 | A * | 2/2000 | Sumida et al. | 239/585.5 |
| 6,119,966 | A * | 9/2000 | Wagner et al. | 239/585.3 |
| 6,253,789 | B1 * | 7/2001 | Krimmer et al. | 137/550 |
| 6,367,720 | B1 * | 4/2002 | Okamoto et al. | 239/585.1 |
| 6,409,101 | B1 * | 6/2002 | D'Arrigo | 239/585.1 |
| 6,530,558 | B1 * | 3/2003 | Schulz | 251/129.21 |
| 6,601,786 | B2 * | 8/2003 | Yamaguchi et al. | 239/585.4 |
| 6,655,608 | B2 * | 12/2003 | Hornby | 239/585.1 |
| 6,666,389 | B2 * | 12/2003 | Ito et al. | 239/585.1 |
| 6,685,114 | B2 * | 2/2004 | Okamoto et al. | 239/585.1 |
| 6,698,664 | B2 * | 3/2004 | Dallmeyer et al. | 239/5 |
| 6,708,906 | B2 * | 3/2004 | Dallmeyer et al. | 239/585.1 |
| 6,719,223 | B2 * | 4/2004 | Yukinawa et al. | 239/584 |
| 2001/0040194 | A1 * | 11/2001 | Yamaguchi et al. | 239/585.4 |
| 2002/0043575 | A1 * | 4/2002 | Sekine et al. | 239/585.1 |
| 2002/0047054 | A1 * | 4/2002 | Dallmeyer et al. | 239/585.1 |
| 2002/0084358 | A1 * | 7/2002 | Dallmeyer et al. | 239/585.1 |
| 2002/0084365 | A1 * | 7/2002 | Dallmeyer et al. | 239/585.1 |
| 2002/0100821 | A1 * | 8/2002 | Yukinawa et al. | 239/585.1 |
| 2003/0010848 | A1 * | 1/2003 | Laumen | 239/585.1 |
| 2003/0015595 | A1 * | 1/2003 | Peterson, Jr. | 239/5 |
| 2003/0047625 | A1 * | 3/2003 | Tinwell et al. | 239/585.4 |
| 2003/0084571 | A1 * | 5/2003 | D'Arrigo | 29/890.124 |
| 2003/0111559 | A1 * | 6/2003 | Muller-Girard et al. | 239/533.3 |
| 2003/0111563 | A1 * | 6/2003 | Tsuchiya et al. | 239/585.1 |
| 2003/0116659 | A1 * | 6/2003 | Sebastian et al. | 239/585.5 |
| 2003/0121999 | A1 * | 7/2003 | Huebel | 239/585.1 |
| 2003/0141390 | A1 * | 7/2003 | Matsuo et al. | 239/585.4 |
| 2003/0230649 | A1 * | 12/2003 | Nagaoka et al. | 239/585.1 |
| 2004/0046063 | A1 * | 3/2004 | Heyse | 239/533.12 |
| 2004/0046066 | A1 * | 3/2004 | Dallmeyer et al. | 239/585.1 |
| 2004/0056120 | A1 * | 3/2004 | Wieczorek et al. | 239/533.12 |

FOREIGN PATENT DOCUMENTS

| | | | |
|---|---|---|---|
| DE | 19503224 | A1 * | 8/1996 |
| EP | 1 170 501 | | 1/2002 |
| EP | 1170501 | A2 * | 1/2002 |

* cited by examiner

INJECTION VALVE FOR FUEL INJECTION

FIELD OF THE INVENTION

The present invention relates to an injection valve for fuel injection, in particular for internal combustion engines of motor vehicles.

BACKGROUND INFORMATION

In an injection valve for fuel-injection systems of internal combustion engines, e.g., as described in German patent document DE 195 03 224, the connection piece is machine-cut from a steel pipe and accommodates the plastic coil brace of the electromagnet wound with the excitation winding and simultaneously forms the magnetic core of the electromagnet. The valve-seat support, which is likewise made from a steel pipe, is joined to the bottom side of the coil brace; it partially encloses the magnetic armature connected to the plastic valve needle, the magnetic armature being guided in the valve-seat support so as to be displaceable by sliding and partially projecting into the coil brace. The magnetic yoke between the magnetic core or connection piece and the magnetic armature is formed by a sleeve-type, ferromagnetic intermediate piece, which is permanently affixed between coil brace and connection piece, i.e., magnetic core, and encloses the magnetic armature via a section projecting beyond the connection piece or magnetic core, in a manner that allows sliding displacement of the magnetic armature. The magnetic armature made from magnetically soft steel is plated with hard chromium to protect it from wear. The plastic valve needle is extruded onto the magnetic armature.

SUMMARY

An injection valve according to the present invention provides the advantage of a less complicated and more cost-effective manufacture since the injection valve is made up of considerably fewer components than the conventional injection valves; in addition, these components are able to be produced by simple injection molding methods. The reduced number of components requires fewer assembly steps and thus less assembly time and is more cost-effective with respect to automatic assembly machines and jointing machines. The manufacturing steps are limited to placing the magnetic core fitted with the magnetic coil in an extrusion die, die casting the magnetic yoke element from magnetic material, subsequent injection-molding of the magnetic yoke element with solenoid coil and iron core to produce the plastic housing, and inserting valve member with valve-closure spring and valve-seat support having the spray-orifice disk in the prefabricated plastic housing. The production steps for the injection molding may be carried out with the aid of a so-called cube system, which uses a block-shaped extrusion die having vertical junction planes, which is rotated by 90° following each production step in order to implement the next production step. At 0°, the cylindrical magnetic core supporting the magnetic coil is inserted; at 90°, the extrusion coating of magnetic coil and magnetic core with the magnetic material takes place in which a gapless connection to the magnetic core is produced. At 180°, the plastic-extrusion coating to produce the plastic housing is carried out, and at 270°, the finished plastic housing with the valve-seat support as well as the connection piece and connection lug for the solenoid coil formed thereon is removed.

According to an example embodiment of the present invention, labyrinth seals are provided between the plastic housing and the extrusion coat, which is made of magnetic material and encloses the solenoid coil; the labyrinth seals are made up of peripheral meshing, which is produced in the extrusion die and extends between the extrusion coat of magnetic material and injection-molded plastic housing in a concentric manner with respect to the magnetic core. This labyrinth seal, in conjunction with the use of fuel-tight plastic for the plastic housing, prevents the escape of fuel from the flow path of the fuel.

According to an example embodiment of the present invention, the solenoid coil has a coil brace, which is made of plastic and slipped over or extruded onto the magnetic core, and an excitation winding, which is wound onto the coil brace. Concentric circumferential labyrinth seals, which are made up of meshing between the coil brace and the extrusion coat made of magnetic material, are once again provided between the coil brace and the extrusion coat of magnetic material for the purpose of sealing from the flow path of the fuel.

In an alternative example embodiment of the present invention the coil brace is omitted and the excitation coiling is made of baked enamel wire and directly wound onto the magnetic core.

According to an example embodiment of the present invention, the valve member is made of plastic and carries an elastomer seal, which cooperates with the valve-seat body and is used to seal the valve opening from the flow path of the fuel. The valve member is produced together with elastomer seal in a two-component injection molding process.

According to an example embodiment of the present invention, the magnetic armature situated on the valve member is made of a magnetically conductive plastic, and the valve member, elastomer seal and magnetic armature are produced in a three-component injection molding process. This achieves additional cost savings due to the simplified manufacture of the valve member.

According to an example embodiment of the present invention, the valve-seat member having the valve opening is likewise made of plastic and permanently joined to the plastic housing, e.g., by laser beam welding, once it has been inserted in the valve-seat support region of the plastic housing.

As an alternative, the valve-seat member may also be made of metal in the conventional manner, sealed from the plastic housing by a ring seal, and safeguarded against axial displacement by a spray-orifice plate which cuts into the plastic housing.

DETAILED DESCRIPTION

Figure 1:
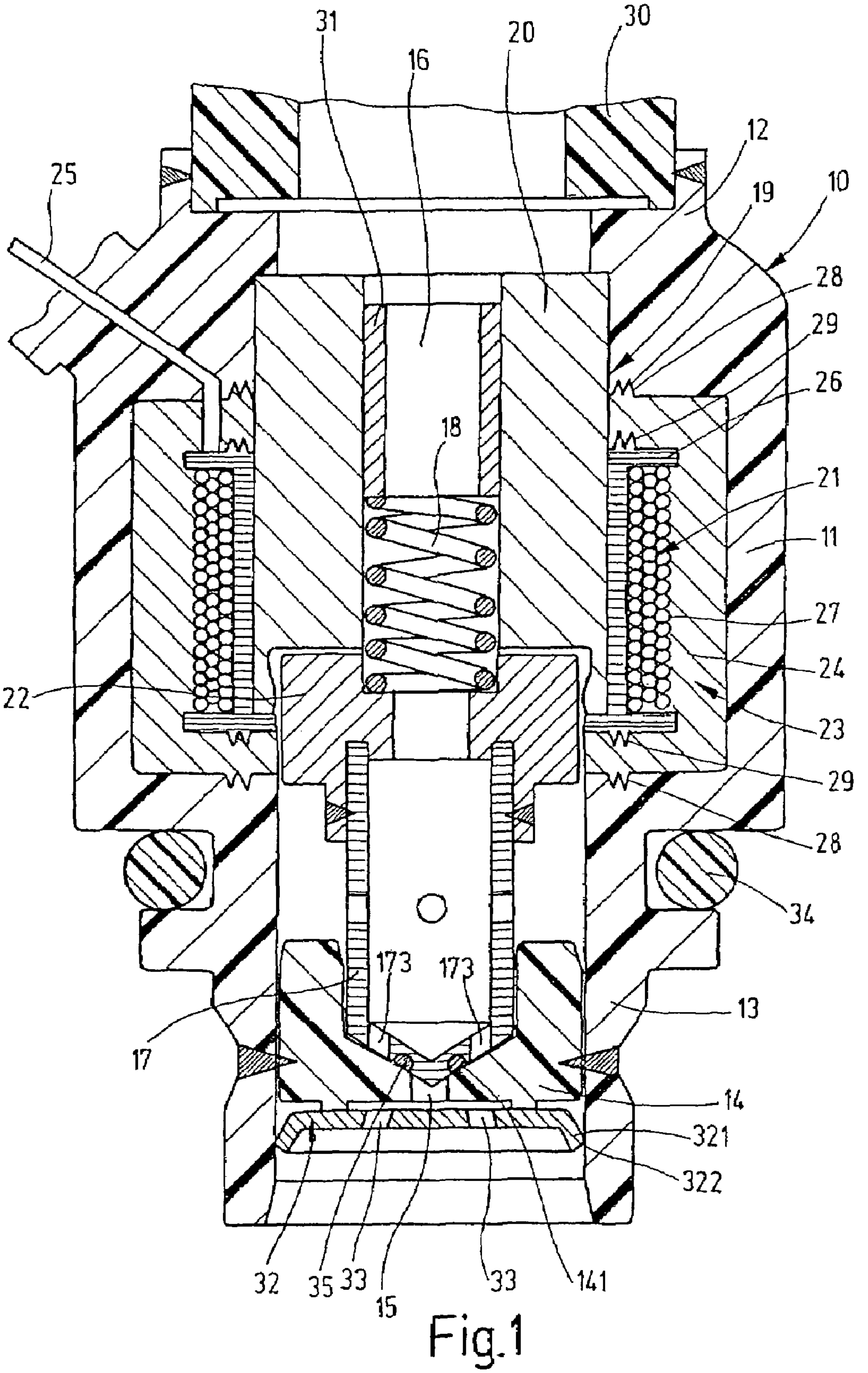
FIG. 1 shows a longitudinal cross-sectional view of an exemplary embodiment of an injection valve for fuel injection.

The injection valve for fuel-injection systems, e.g., of motor vehicles, shown in longitudinal section in FIG. 1, has a plastic housing 10, made of a fuel-tight plastic, at whose one end a connection piece 12 is formed and at whose other end a valve-seat support 13 is formed. Connection piece 12 and valve-seat support 13 are combined into one piece by plastic coat 11 lying between them, in order to form complete plastic housing 10. Connection piece 12 is used to connect the injection valve to a fuel-supply line 30, a so-called rail. Valve-seat support 13 accommodates a valve-seat body 14 in which a valve opening 15 is located, which is surrounded by a valve seat 141. Valve opening 15 is connected to connection piece 12 via a fuel-flow path 16 provided in the interior of plastic housing 11. A valve member 17, which cooperates with a valve seat 141 formed on valve-seat body 14, is used to control valve opening 15 for the purpose of spray-discharging fuel via valve opening 15. A valve-closure spring 18 presses valve member 17 onto valve seat 141 and thereby closes valve opening 15. A solenoid 19 opens the injection valve by lifting valve member 17 off valve seat 141, counter to the force of valve-closure spring 18, by energizing solenoid 19. Solenoid 19 is encased by plastic coat 11, which is situated between connection piece 12 and valve-seat support 13 and connects them to one another to form one piece.

Solenoid 19 is made up of a hollow-cylindrical magnetic core 20 made of ferromagnetic material through which fuel flow path 16 is guided; a solenoid coil 21; a magnetic armature 22 affixed on valve member 17, the magnetic armature likewise having an axial bore for plastic fuel-flow path 16 and lying coaxially with respect to magnetic core 20; and a magnetic yoke element 23, which closes the magnetic circuit via magnetic core 20 and magnetic armature 22.

To achieve a simplified valve design with few components and low assembly costs, solenoid coil 21 is situated directly on magnetic core 20, and magnetic core 20 with solenoid coil 21 is placed in an injection-molding die, which is extrusion-coated with a magnetically conductive material—denoted as magnetic material in brief—to yield magnetic yoke element 23, a gapless connection being produced between magnetic material extrusion coat 24 and magnetic core 20. The component premanufactured in this manner is placed inside another injection-molding die with whose aid plastic housing 10 is injection-molded. The component is enveloped by plastic coat 11, and the regions of connection piece 12 and valve-seat support 13 are injection-molded onto plastic coat 11 at the same time. Finished plastic housing 10, in which complete solenoid 19—with the exception of magnetic armature 22—is already integrated, is removed from the injection-molding die.

In the exemplary embodiment of FIG. 1, solenoid coil 21 has a coil brace 26 made of plastic and an excitation winding 27, which is wound onto coil brace 26 and made of enameled armature wire. Excitation winding 27 is wound onto premanufactured coil brace 26 and connected via the ends of its windings to plug pins 25 held on coil brace 26. Wound coil brace 26 is slipped over magnetic core 20. As an alternative, coil brace 26 is produced by extrusion-coating magnetic core 20 with plastic material and then winding up excitation winding 27 and fitting it with plug pins 25. To seal excitation winding 27 from fuel-flow path 16, two labyrinth seals 28, which are concentric with respect to the housing axis, are provided between magnetic material extrusion coat 24 and plastic housing 10, and two labyrinth seals 29, which likewise extend concentrically, are provided between coil brace 26 and magnetic material extrusion-coat 24. Each labyrinth seal 29 is realized by meshing between the mutually abutting components, i.e., magnetic material extrusion coat 24 and plastic housing 10 on the one side, and magnetic material extrusion coat 24 and coil brace 26 on the other side.

To complete the injection valve, valve-closure spring 18, valve member 17 with magnetic armature 22 affixed thereon, and valve-seat body 14 must still be inserted in plastic housing 10 having integrated solenoid 19. To adjust the valve lift, valve-seat body 14 is positioned in the region of valve-seat support 13 of plastic housing 10 with the utmost precision and anchored on plastic housing 10 in a manner that prevents axial displacement. Valve-closure spring 18, accommodated in magnetic core 20, is braced on magnetic armature 22 and on an adjustment sleeve 31, which is inserted in magnetic core 20 and anchored therein. The initial stress of valve-closure spring 18 is specified by means of adjustment sleeve 31. In addition, downstream from valve-seat body 14 in the flow direction of the fuel, there is a spray-orifice plate 32 having spray orifices 33, which is either affixed on plastic housing 10 or on valve-seat body 14, so that the fuel discharging from valve opening 15 when the injection valve is open is spray-discharged via spray orifices 33 of spray-orifice plate 32. The injection valve is sealed from the bore wall in the cylinder head of a combustion engine or an internal combustion engine via a sealing ring 34 and attached to fuel-supply line 30 or rail via its region of plastic housing 10 formed as connection piece 12 and joined to fuel-supply line 30 or rail in a fuel-tight manner by laser-beam welding.

In the exemplary embodiment of FIG. 1, sleeve-type valve member 17, sealed at one sleeve end and provided with flow-through openings 173 for the fuel, is made of plastic and has an elastomer seal 35 on its end region that comes into contact with valve seat 141 on valve-seat body 14; elastomer seal 35 presses onto valve seat 141 when the injection valve is closed and in this manner seals valve opening 15 from fuel-flow path 16. Valve member 17 and elastomer seal 35 are advantageously produced in a two-component injection-molding process. Magnetic armature 22 is affixed on valve member 17 as separate component. Magnetic armature 22 is advantageously made of a magnetically conductive plastic (magnetic plastic) and produced in a three-component injection-molding process together with valve member 17 and elastomer seal 35.

In the exemplary embodiment of FIG. 1, valve-seat body 14 is likewise made of plastic and permanently affixed inside plastic housing 10 by laser-beam welding. Formed on spray-orifice plate 32 is a flexible annular region 321, which is prestressed and, due to its excess spring force, "claws" into the inner wall of plastic housing 10 via a ring edge 322.

Figure 5:
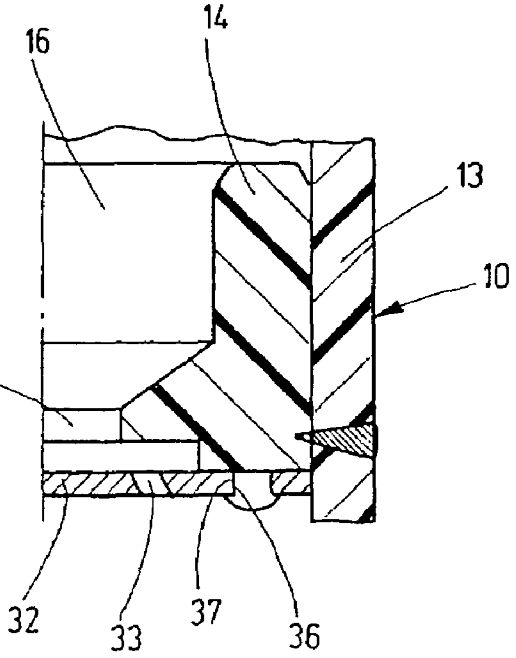

In an alternative embodiment, shown in FIG. 5, of valve-seat body 14 made of plastic, valve-seat body 14 has integrally formed pegs 36 on its bottom side facing spray-orifice plate 32, which are able to be guided through congruent openings 37 in spray-orifice plate 32. Spray-orifice plate 32 is placed on the bottom side of valve-seat member 14 in such a way that pegs 36 project through openings 37. Pegs 36 are then deformed in their end region projecting beyond spray-orifice plate 32, for instance with the aid of ultrasound or by hot-stamping, so that a type of plastic-rivet connection is produced between valve-seat body 14 and spray-orifice plate 32.

Figure 2:
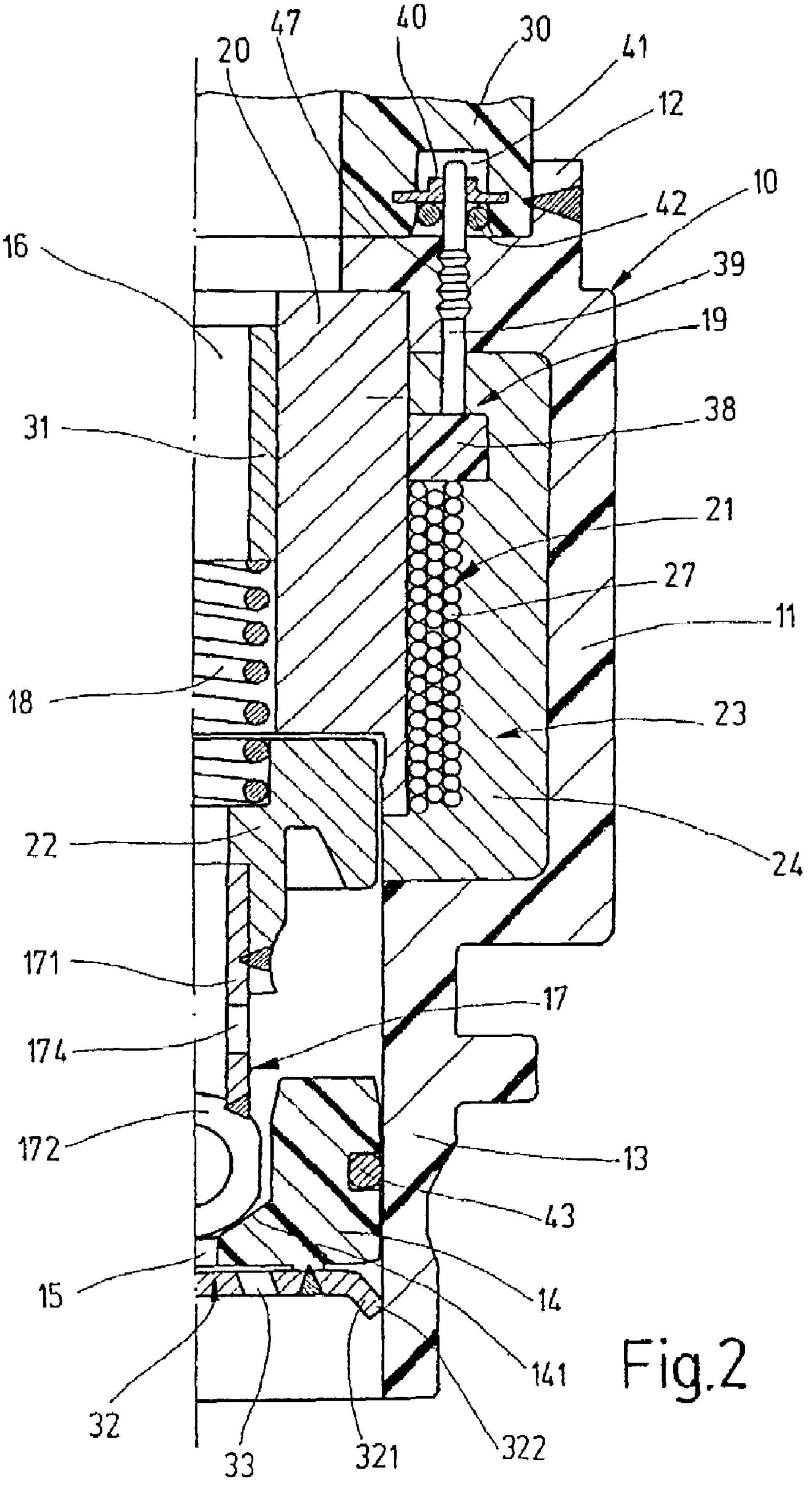
FIG. 2 shows a longitudinal half-section of an injection valve according to an additional exemplary embodiment.

The injection valve according to the exemplary embodiment shown in FIG. 2 is modified in several aspects with respect to the previously described injection valve. For instance, the coil brace in solenoid coil 21 has been omitted, and excitation winding 27 made of baked enamel wire is wound directly onto hollow-cylindrical magnetic core 20. The winding ends of excitation winding 27 are affixed inside a plastic part 38 enclosed by magnetic material extrusion coat 24. Plug pins 39, connected to the winding ends of excitation winding 27, lead out of this plastic part 38 through plastic housing 10. When magnetic material extrusion coat 24 is extruded, plastic part 38 having plug pins 39 connected to excitation winding 27 is placed in the injection die as well and is thereby already fixed in place in the subsequent injection molding of plastic housing 10. Fuel-supply line 30, or rail, has been provided with plug sockets 40, which are situated in a recess 41 and contacted by plug pins 39, which slide into plug sockets 40 when connection piece 12, which is integrally formed on plastic housing 10, is slipped over fuel-supply line 30. Plug sockets 40 are connected to electrical connection leads (not shown) in order to energize excitation coil 27. To seal from the fuel, sealing rings 42 are placed in recess 41 accommodating sockets 40, each of which seals one plug pin 39 on the bottom side of socket 40 facing plastic housing 10 from the wall of recess 41 in fuel-supply line 30. Sealing ring 42 may be omitted if plug pins 39 are provided with texture 47 such as meshing or heavy ribbing. In FIG. 2, texture 47 is additionally indicated in a sectional area of plug pin 39. Since the materials of plastic coat 11 and plug pins 39 have different coefficients of thermal expansion, mutual gripping comes about between plastic coat 11 and plug pins 39 in the region of texture 47, so that fluid-tight sealing of plug pins 39 is achieved.

In the exemplary embodiment of FIG. 2, valve-seat body 14 is made of metal in the conventional manner and sealed from the inner wall of plastic housing 10 by a sealing ring 43, which lies in a circumferential groove 44 in valve-seat body 14. Spray-orifice plate 32 downstream from valve-seat body 14 has the same shape and is affixed inside plastic housing 10 as described in connection with FIG. 1. Valve-seat body 14 is fixed in place on spray-orifice plate 32 by laser-beam welding, for instance and, due to ring edge 322 of spray-orifice plate 32, which claws into the inner wall of plastic housing 10, is secured in a manner that prevents axial displacement. Valve member 17 is made of metal in the conventional manner and made up of a sleeve-shaped valve needle 171 having radial bores 174 for the passage of fuel, and a valve-closure top 172, which is welded onto the front end of valve needle 171 and cooperates with valve seat 141 formed on valve-seat body 14. Magnetic armature 22 is placed on the end of valve needle 171 facing away from valve-closure top 172 and welded thereto.

Figure 3:
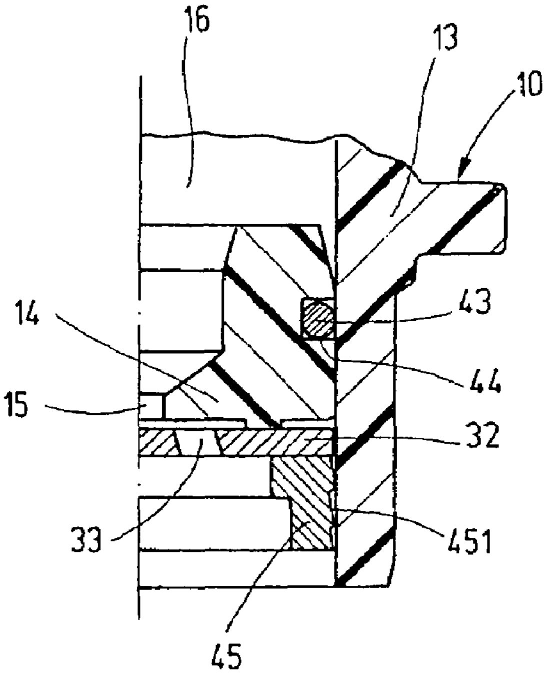
FIGS. 3 through 5 show three exemplary embodiments of the injection valve, shown in half section, which are modified with respect to the integration of the valve-seat member in the plastic housing.
Figure 4:
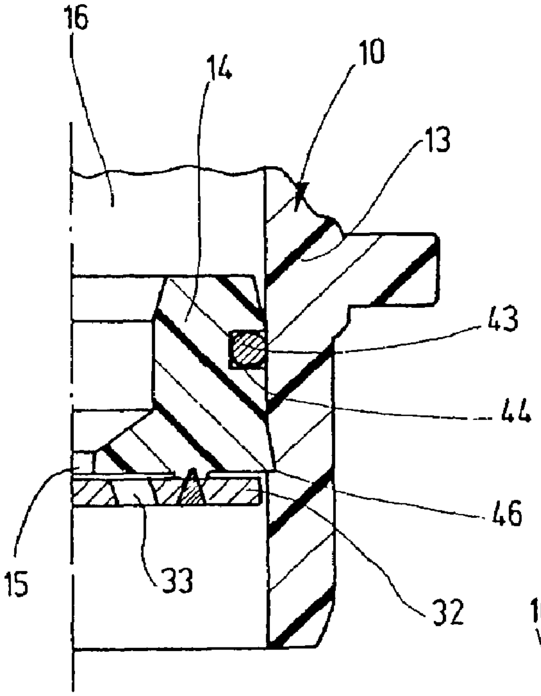

FIGS. 3 and 4 show two additional exemplary embodiments for affixing a valve-seat body 14 made of metal inside plastic housing 10. Valve-seat body 14 has a circumferential groove 44, like valve-seat body 14 in FIG. 2, in which sealing ring 43 is situated, which seals with respect to the inner wall of plastic housing 10. In the exemplary embodiment of FIG. 3, valve-seat body 14 and spray-orifice plate 32 are fixed in place with the aid of a prestressed profile ring 45, which has excessive spring tension and buries itself in the wall of plastic housing 10 by its saw-tooth-type profile formed on the outer circumference.

In the exemplary embodiment of FIG. 4, valve-seat body 14 is widened in the press-in direction, i.e., its diameter increases in the press-in direction. A profile edge 46 is formed at its end face having the largest diameter, which buries itself in the inner wall of plastic housing 10 and thus prevents further axial displacement of valve-seat body 14. Spray-orifice plate 32 is affixed on the bottom side of valve-seat body 14, by welding, for instance.

What is claimed is:

1. A fuel injection valve for an internal combustion engine, comprising:

a connection piece for a fuel-supply line, wherein the connection piece is connected to a valve opening of a valve-seat body via a fuel flow path;

a valve-seat support, wherein the valve-seat body having the valve opening is fixed in place on the valve-seat support;

a valve member which is situated inside the valve-seat support and controls the valve opening;

a solenoid which actuates the valve member, wherein the solenoid includes a magnetic armature situated on the valve member, a magnetic core which is coaxial with respect to the magnetic armature, a solenoid coil surrounding the magnetic core, and a yoke element which closes a magnetic circuit via the magnetic core and magnetic armature; and a plastic coat which encloses the connection piece, the solenoid and the valve-seat support;

wherein:

the connection piece and the valve-seat support are made of plastic and configured as one-piece plastic housing together with the plastic coat;

the yoke element is formed by a metallic magnetic material extrusion coat of the solenoid coil;

the solenoid coil has an excitation winding that is directly extrusion-coated by the metallic magnetic material extrusion coat, such that the excitation winding is enclosed by the yoke element and such that the yoke element adjoins the magnetic core in a gapless manner and ends in front of the magnetic armature with a gap clearance, the magnetic armature being directly guided in the yoke element; and the plastic coat of the plastic housing completely encloses the yoke element at a side of the yoke element that faces away from the excitation winding.

2. A fuel injection valve for an internal combustion engine, comprising:

a connection piece for a fuel-supply line, wherein the connection piece is connected to a valve opening of a valve-seat body via a fuel flow path;

a valve-seat support, wherein the valve-seat body having the valve opening is fixed in place on the valve-seat support;

a valve member which is situated inside the valve-seat support and controls the valve opening;

a solenoid which actuates the valve member, wherein the solenoid includes a magnetic armature situated on the valve member, a magnetic core which is coaxial with respect to the magnetic armature, a solenoid coil surrounding the magnetic core, and a yoke element which closes a magnetic circuit via the magnetic core and magnetic armature;

a plastic coat which encloses the connection piece, the solenoid and the valve-seat support;

a spray-orifice plate situated in the valve-seat support, downstream from the valve-seat body in a flow direction of the fuel;

wherein:

the connection piece and the valve-seat support are made of plastic and configured as one-piece plastic housing together with the plastic coat;

the spray-orifice plate includes an elastic annular region which is prestressed and penetrates into the plastic housing via a ring edge; and the valve-seat body is affixed on one of the spray-orifice plate and the plastic housing.

3. The injection valve as recited in claim 2, wherein the plastic housing is made of fuel-tight plastic, by extrusion-coating of the magnetic core, and the magnetic material extrusion coat which encloses the solenoid coil.

4. The injection valve as recited in claim 3, further comprising:

a plurality of labyrinth seals which seal against the fuel-flow path, wherein the labyrinth seals are provided between the magnetic material extrusion coat and the plastic housing, and wherein each labyrinth seal is made of meshing between the magnetic material extrusion coat and the plastic housing.

5. The injection valve as recited in claim 2, wherein the solenoid coil has a coil brace made of plastic, the coil brace being one of slipped over and injection-molded onto the magnetic core, and wherein the solenoid coil has an excitation winding wound onto the coil brace, and wherein connection ends of the excitation winding are fixed in place on the coil brace and contacted by plug pins guided through the plastic housing.

6. The injection valve as recited in claim 5, further comprising:

a plurality of labyrinth seals which seal against the fuel-flow path, wherein the labyrinth seals are provided between the coil brace and the magnetic material extrusion coat, and wherein each labyrinth seal is made of meshing between the coil brace and the magnetic material extrusion coat.

7. The injection valve as recited in claim 2, wherein the solenoid coil has an excitation winding which is directly wound onto the magnetic core, and wherein connection ends of the excitation winding are contacted by plug pins which are fixed in place in a plastic part enclosed by the magnetic material extrusion coat and guided through the plastic housing.

8. The injection valve as recited in claim 7, wherein the plug pins are at least partially provided with texture including one of meshing and ribbing.

9. The injection valve as recited in claim 2, wherein the valve member is made of plastic and has an elastomer seal in a contact region with the valve-seat body, wherein the elastomer seal provides sealing with respect to the valve opening.

10. The injection valve as recited in claim 9, wherein the valve member including the elastomer seal is produced in a two-component injection molding process.

11. The injection valve as recited in claim 9, wherein the magnetic armature situated on the valve member is made of magnetically conductive plastic, and wherein the valve member is produced in a three-component injection molding process together with the elastomer seal and the magnetic armature.

12. The injection valve as recited in claim 2, wherein the valve-seat body has a diameter that increases in a press-in direction into the valve-seat support, and wherein the valve-seat body has a profile edge on an end face having the largest diameter, and wherein the profile edge cuts into an inner wall of the plastic housing.

13. A fuel injection valve for an internal combustion engine, comprising:

a connection piece for a fuel-supply line, wherein the connection piece is connected to a valve opening of a valve-seat body via a fuel flow path;

a valve-seat support, wherein the valve-seat body having the valve opening is fixed in place on the valve-seat support;

a valve member which is situated inside the valve-seat support and controls the valve opening;

a solenoid which actuates the valve member, wherein the solenoid includes a magnetic armature situated on the valve member, a magnetic core which is coaxial with respect to the magnetic armature, a solenoid coil surrounding the magnetic core, and a yoke element which closes a magnetic circuit via the magnetic core and magnetic armature;

a plastic coat which encloses the connection piece, the solenoid and the valve-seat support;

a spray-orifice plate situated in the valve-seat support, downstream from the valve-seat body in a flow direction of the fuel;

wherein:

the connection piece and the valve-seat support are made of plastic and configured as one-piece plastic housing together with the plastic coat; and the spray-orifice plate and the valve-seat body are fixed in place inside the valve-seat support with the aid of a slotted and prestressed profile ring which is inserted in the valve-seat support and has an outer profile that cuts into an inner wall of the plastic housing.

14. The injection valve as recited in claim 13, wherein the valve-seat body has a circumferential groove, and wherein a sealing ring is positioned in the circumferential groove, and wherein the sealing ring provides sealing with respect to an inner wall of the plastic housing.

15. The injection valve as recited in claim 13, wherein the plastic housing is made of fuel-tight plastic, by extrusion-coating of the magnetic core, and the magnetic material extrusion coat which encloses the solenoid coil.

16. The injection valve as recited in claim 15, further comprising:

a plurality of labyrinth seals which seal against the fuel-flow path, wherein the labyrinth seals are provided between the magnetic material extrusion coat and the plastic housing, and wherein each labyrinth seal is made of meshing between the magnetic material extrusion coat and the plastic housing.

17. The injection valve as recited in claim 13, wherein the solenoid coil has a coil brace made of plastic, the coil brace being one of slipped over and injection-molded onto the magnetic core, and wherein the solenoid coil has an excitation winding wound onto the coil brace, and wherein connection ends of the excitation winding are fixed in place on the coil brace and contacted by plug pins guided through the plastic housing.

18. The injection valve as recited in claim 17, further comprising:

a plurality of labyrinth seals which seal against the fuel-flow path, wherein the labyrinth seals are provided between the coil brace and the magnetic material extrusion coat, and wherein each labyrinth seal is made of meshing between the coil brace and the magnetic material extrusion coat.

19. The injection valve as recited in claim 13, wherein the solenoid coil has an excitation winding which is directly wound onto the magnetic core, and wherein connection ends of the excitation winding are contacted by plug pins which are fixed in place in a plastic part enclosed by the magnetic material extrusion coat and guided through the plastic housing.

20. The injection valve as recited in claim 13, wherein the valve member is made of plastic and has an elastomer seal in a contact region with the valve-seat body, wherein the elastomer seal provides sealing with respect to the valve opening.

21. A fuel injection valve for an internal combustion engine, comprising:

a connection piece for a fuel-supply line, wherein the connection piece is connected to a valve opening of a valve-seat body via a fuel flow path;

a valve-seat support, wherein the valve-seat body having the valve opening is fixed in place on the valve-seat support;

a valve member which is situated inside the valve-seat support and controls the valve opening;

a solenoid which actuates the valve member, wherein the solenoid includes a magnetic armature situated on the valve member, a magnetic core which is coaxial with respect to the magnetic armature, a solenoid coil surrounding the magnetic core, and a yoke element which closes a magnetic circuit via the magnetic core and magnetic armature;

a plastic coat which encloses the connection piece, the solenoid and the valve-seat support;

a spray-orifice plate situated in the valve-seat support, downstream from the valve-seat body in a flow direction of the fuel;

wherein:

the connection piece and the valve-seat support are made of plastic and configured as one-piece plastic housing together with the plastic coat;

the valve-seat body is made of plastic and is affixed on the plastic housing by laser-beam welding;

the valve-seat body has pegs on a bottom side facing the spray-orifice plate; and the pegs project through congruent openings in the spray-orifice plate and are deformed in the manner of a rivet head on the side of the spray-orifice plate facing away from the valve-seat body.

* * * * *